(12) United States Patent
Livowsky

(10) Patent No.: US 6,446,064 B1
(45) Date of Patent: Sep. 3, 2002

(54) SYSTEM AND METHOD FOR ENHANCING E-COMMERCE USING NATURAL LANGUAGE INTERFACE FOR SEARCHING DATABASE

(75) Inventor: Jean-Michel Livowsky, Epinay S/Seine (FR)

(73) Assignee: Albert Holding SA, Castelnau-le-Lez (FR)

( * ) Notice: Subject to any disclaimer, the term of this patent is extended or adjusted under 35 U.S.C. 154(b) by 0 days.

(21) Appl. No.: 09/327,604

(22) Filed: Jun. 8, 1999

(51) Int. Cl.[7] .............................................. G06F 17/30

(52) U.S. Cl. ...................... 707/5; 707/2; 707/3; 707/10; 704/4; 704/7; 704/9

(58) Field of Search ............................... 707/3, 4, 5, 6; 704/4, 7, 9, 253

(56) References Cited

U.S. PATENT DOCUMENTS

| | | | | |
|---|---|---|---|---|
| 4,674,066 A | * | 6/1987 | Kucera | ........................ 364/900 |
| 4,974,191 A | | 11/1990 | Amirghodsi et al. | ........ 364/900 |
| 5,197,005 A | | 3/1993 | Shwartz et al. | ............. 364/419 |

(List continued on next page.)

FOREIGN PATENT DOCUMENTS

| | | | | |
|---|---|---|---|---|
| JP | 11 045266 | 2/1999 | ........... | G06F/17/30 |
| WO | WO 98/25217 | 6/1998 | ........... | G06F/17/30 |
| WO | WO 98/26357 | 6/1998 | ........... | G06F/17/30 |
| WO | WO 98/49640 | 11/1998 | ........... | G06F/17/60 |
| WO | WO 00/03329 | 1/2000 | ........... | G06F/17/00 |

OTHER PUBLICATIONS

KAren Kukich:"Techniques for Automatically Correcting Words in Text", Dec. 1992, ACM, vol. 24, No. 4, pp. 378–439.*

Zobel et al.:"Phonetic String Matching: Lessons from information Retrieval", Aug. 1996, ACM 0–89791–792, pp. 166–172.*

Das, Bikas et al. "Experiments In Using Agent–Based Retrieval from Distributed and Heterogeneous Databases," IEEE 1997, pp. 27–35, XP–002144267.

(List continued on next page.)

*Primary Examiner*—Diane D. Mizrahi
*Assistant Examiner*—Jacques Veillard
(74) *Attorney, Agent, or Firm*—Howrey Simon Arnold & White, LLP

(57) ABSTRACT

A system and method for enhancing e-commerce using a natural language interface. The natural language interface allows the user to formulate a query in a natural language form, rather than in conventional search terms. The natural language interface provides the user with a "user friendly" interface. The natural language interface can process a query even if there is not an exact match between the user formulated search words and the content in the database. Furthermore, the natural language interface is capable of processing misspelled queries or queries having syntax errors. The method for enhancing e-commerce using a natural language interface comprises the steps of accessing a user interface provided by a service provider, entering a query using a natural language interface, the query being formed in a natural language, processing the query by the natural language interface, searching a database using the processed query, retrieving results from the database, and providing the results to the user. The system for enhancing e-commerce on the Internet comprises a user interface for receiving a query in a natural language form, a natural language interface coupled to the user interface for processing the query, a service provider coupled to the user interface for receiving the processed query, and one or more databases coupled to the user interface for storing information, wherein the system searches the databases using the processed query and provides the results to the user through the user interface.

13 Claims, 2 Drawing Sheets

U.S. PATENT DOCUMENTS

| | | | |
|---|---|---|---|
| 5,218,536 A | 6/1993 | McWherter | 364/419 |
| 5,257,366 A | 10/1993 | Adair et al. | 395/600 |
| 5,265,065 A | 11/1993 | Turtle | 395/600 |
| 5,317,742 A | 5/1994 | Bapat | 395/700 |
| 5,377,103 A * | 12/1994 | Lamberti et al. | 364/419.08 |
| 5,386,556 A | 1/1995 | Hedin et al. | 395/600 |
| 5,404,507 A | 4/1995 | Bohm et al. | 395/600 |
| 5,410,688 A | 4/1995 | Williams et al. | 395/600 |
| 5,428,772 A | 6/1995 | Merz | 395/600 |
| 5,454,106 A * | 9/1995 | Burns et al. | 395/600 |
| 5,491,820 A | 2/1996 | Belove et al. | 395/600 |
| 5,519,608 A | 5/1996 | Kupiec | 364/419.08 |
| 5,555,169 A * | 9/1996 | Namba et al. | 364/419.08 |
| 5,590,319 A | 12/1996 | Cohen et al. | 395/604 |
| 5,590,322 A | 12/1996 | Harding et al. | 395/604 |
| 5,640,555 A | 6/1997 | Kleewein et al. | 395/610 |
| 5,684,999 A | 11/1997 | Okamoto | 395/759 |
| 5,694,593 A | 12/1997 | Baclawski | 395/605 |
| 5,706,499 A | 1/1998 | Kleewein et al. | 395/610 |
| 5,740,421 A | 4/1998 | Palmon | 395/604 |
| 5,752,028 A | 5/1998 | Ellacott | 395/600 |
| 5,754,841 A | 5/1998 | Carino, Jr. | 395/603 |
| 5,761,663 A | 6/1998 | Lagarde et al. | 707/10 |
| 5,765,028 A | 6/1998 | Gladden | 395/11 |
| 5,768,577 A | 6/1998 | Kleewein et al. | 395/610 |
| 5,768,589 A | 6/1998 | Bradley et al. | 395/684 |
| 5,778,368 A | 7/1998 | Hogan et al. | 707/10 |
| 5,787,410 A | 7/1998 | McMahon | 707/1 |
| 5,787,424 A | 7/1998 | Hill et al. | 707/6 |
| 5,809,502 A | 9/1998 | Burrows | 707/7 |
| 5,826,261 A | 10/1998 | Spencer | 707/5 |
| 5,864,845 A | 1/1999 | Voorhees et al. | 707/5 |
| 5,864,846 A | 1/1999 | Voorhees et al. | |
| 5,873,080 A | 2/1999 | Coden et al. | 707/3 |
| 5,878,219 A | 3/1999 | Vance, Jr. et al. | 395/200.47 |
| 5,884,302 A | 3/1999 | Ho | 707/3 |
| 5,895,466 A * | 4/1999 | Goldberg et al. | 707/5 |
| 5,956,711 A * | 9/1999 | Sullivan et al. | 707/6 |
| 6,144,958 A * | 11/2000 | Ortega et al. | 707/5 |

OTHER PUBLICATIONS

Julian, Lauri et al. "Brightware Ships Web's First Automated Real–Time Advice Agent," Brightware, Inc. Press Release, Jun. 29, 1998. XP–002924861. Http://www.brightware.com/news/99$_{13}$6$_{13}$2$_{13}$9$_{13}$ bwships.html.

Lai, Hsiangchu et al. "A System Architecture of Intelligent–Guided Browsing on the Web," IEEE 1998, pp. 423–432. XP–002128394.

Yang, Kiduk et al. "IRIS at TREC–7," Seventh Test Retrieval Conference, Nov. 9–11, 1998, p. 1. XP–002142686.

* cited by examiner

SYSTEM AND METHOD FOR ENHANCING E-COMMERCE USING NATURAL LANGUAGE INTERFACE FOR SEARCHING DATABASE

BACKGROUND OF THE INVENTION

I. Related Applications

This application is related to concurrently filed U.S. application Ser. No. 09/327,605 filed on Jun. 8, 1999, commonly assigned, and which is incorporated herein by reference, and U.S. application Ser. No. 09/327,603 filed on Jun. 8, 1999, commonly assigned, and which is incorporated herein by reference.

II. Field of the Invention

The present invention relates generally to e-commerce, and more particularly to a system and method for enhancing e-commerce using a natural language interface.

III. Description of the Related Art

Recently, there has been a rapid growth in commercial activities on the Internet. Today, consumers are frequently relying on the Internet to purchase goods and services. For example, consumers are using the Internet to purchase airline tickets, books, music, etc. This type of transactions is commonly referred to as electronic commerce or "e-commerce."

Many retailers provide e-commerce services on the Internet. These services enable buyers to purchase various goods and services on the Internet. FIG. 1 illustrates a conventional e-commerce system 100 that a consumer can use to purchase, for example, a book or an airline ticket. The system 100 comprises a user interface 104, a service provider 108, and one or more database 112.

In the system 100, a consumer can be linked to the user interface 108 via the Internet or other communication links. The consumer purchases goods and services using the service provider 108. The service provider 108 provides the consumer links to one or more databases 112. The service provider 108 may be a retailer, in which case it may provide links to its own databases 112. Alternately, the service provider may merely provide links to other retailers' databases.

The database 112 may be one or more server computers that store a list of goods or services. For example, one of the database 112 may include a list of all car dealers in a particular geographical area. Each record in the database 112 may include, for example, the name of a dealer, an address, makes, models, and prices.

The service provider 108 provides the user interface 104 with a web page or a form via which the consumer can access the system 100. The consumer uses the web page or the form to formulate a "query" (or a "search request"). In operation, the consumer formulates a query using the user interface 104. For example, the consumer may type "Car Dealers in Chicago". In response, the service provider 108 will search the databases 112 and provide a list of car dealers in Chicago. The list provides links to the auto dealers. Then the consumer may select a dealer from the list, and enter the dealer's own web page. The consumer can view the web page and learn more about the cars offered for sale by the dealer. Finally, the consumer can order a car through the web page. This example illustrates how the consumer can use the system 100 to conduct a commercial transaction.

Although, users may conduct transactions using conventional e-commerce systems, there are many disadvantages associated with them. Most systems are not "user friendly." For example, they do not accept queries in a natural language form. Most systems require users to formulate search words with Boolean operators. Thus, users unfamiliar with boolean operators experience difficulties using these search engines.

Also, most systems provide results only if there is an exact match between the user formulated search words and contents in the database. Most systems do not consider synonyms and other approximations of the search words. Thus, if the user does not use the "right" word in the query, it is likely that the search engine will fail to find a relevant answer for the user. Referring back to the above example, if the user types "Vehicle Dealer in Chicago", the system 100 may not be able to process the query. This is due to the fact that the system 100 may not understand that "vehicle" is a synonym for "car."

Furthermore, most systems are not capable of processing misspelled queries or queries having syntax errors. Most systems can not deal with spelling and syntax errors. Thus a user who made a spelling or a syntax error in the query may not be able to find an answer.

Moreover, most systems do not provide user specific or personalized answers. For example, if a butcher, a stockbroker, and a boxer each include the word "pound" in a query, they may not be referring to the same object. Since the word "pound" may have different meaning depending on the context, most systems will not be able to correctly process the query for all three users. Thus, most systems may provide a correct answer to the butcher, but may provide an incorrect answer to the stockbroker and the boxer.

Also, most systems are rigid in that their knowledge database does not evolve through use. Most systems do not extract information from prior search sessions to upgrade its own vocabulary and knowledge database. Also, most systems require an extensive dictionary to operate.

For these reasons, it has been recognized that there is a need for an interface for an e-commerce system that is user friendly and accepts natural language queries. Also, there is a need for an interface that can process misspelled queries and queries having syntax errors. Moreover, there is a need for an interface that allows a system to provide user specific or personalized answers. Furthermore, there is a need for an interface that allows a system to extract information from prior search sessions and upgrade its own vocabulary and knowledge database.

SUMMARY OF THE INVENTION

The present invention is directed to a system and method for enhancing e-commerce using a natural language interface. In one embodiment, a method for enhancing e-commerce using a natural language interface comprises the steps of accessing a user interface provided by a service provider, entering a query using a natural language interface, the query being formed in a natural language, processing the query by the natural language interface, searching a database using the processed query, retrieving results from the database, and providing the results to the user.

In one embodiment, a system for enhancing e-commerce on the Internet comprises a user interface for receiving a query in a natural language form, a natural language interface coupled to the user interface for processing the query, a service provider coupled to the user interface for receiving the processed query, and one or more databases coupled to the user interface for storing information about one or more retailers selling goods and services on the Internet, wherein the system searches the databases using the processed query and provides the results to the user through the user interface.

BRIEF DESCRIPTION OF THE DRAWINGS

In the drawings, like reference numbers generally indicate identical, functionally similar, and/or structurally similar elements. The drawings in which an element first appears is indicated by the leftmost digit(s) in the reference number.

DETAILED DESCRIPTION OF THE INVENTION

I. Overview of the Invention

The present invention is directed to a system and method for enhancing e-commerce using a natural language interface. In one embodiment, the system includes a user interface, a natural language interface, a service provider and one or more databases. In one embodiment, the database holds information regarding goods and services sold by retailers. The database may be a general database engine (including, but not limited to Access, Oracle, Sybase, SQL-Server databases), an internal database, located on a network (including, but not limited to intranet or the Internet). The invention allows consumers to conduct e-commerce using a natural language, rather than conventional search terms.

In one embodiment, the natural language interface is a computer program code, written in C++, Java or any other well known computing language, and configured to process a query (also referred to as a search request) formed in a natural language.

Briefly stated, the system analyzes the query and converts it into one or more search words (also referred to as search terms). The search words are further converted into a string of bytes, and a database referred to as a target database is searched. If there is a match between the integer bytes and raw data in the target database, the raw data is retrieved from the target database. The raw data is then formatted into a selected format and provided to a user. The raw data may include multimedia content, including video, audio, and data. Optionally, the raw data can be provided to the user unformatted.

II. Description of the Preferred Embodiments

Figure 1:
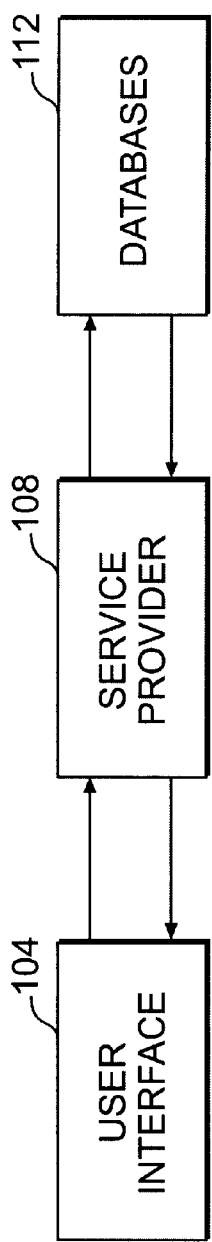
FIG. 1 illustrates a conventional e-commerce system.
Figure 2:
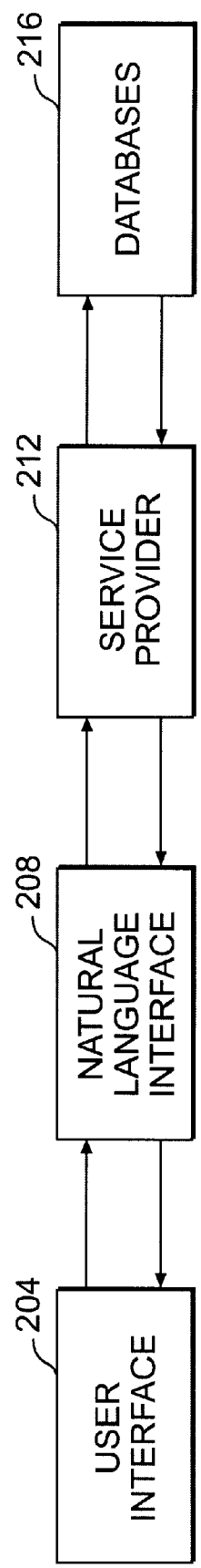
FIG. 2 illustrates a system for enhancing e-commerce using a natural language interface in accordance with one embodiment of the present invention.

FIG. 2 illustrates a system 200 for enhancing e-commerce using a natural language interface in accordance with one embodiment of the present invention. The system 200 comprises a user interface 204, a natural language interface 208, a service provider 212, and one or more databases 216.

In one embodiment, the user accesses the user interface 204 via the Internet. The service provider 212 provides links to one or more databases 216. The service provider 112 may be a retailer, in which case it provides links to its own database 216. Alternately, the service provider may merely provide links to other retailers' databases.

The database 216 may store a list of retailers that sell goods or services. In one embodiment, the service provider 212 provides the user interface 204. The user interface 204 may be a web page, a form, etc., via which the user can access the system 200 and conduct a transaction. The user uses the web page (or the form) to formulate a query.

The natural language interface 208 is at the core of the invention. The natural language interface 208 is coupled to the user interface. The user can access the natural language interface 208 through the user interface 204.

The natural language interface 208 is described in detail in the concurrently filed and commonly assigned U.S. Patent application No. 09/327,605 titled "Natural Language Interface for Searching Database", filed Jun. 8, 1999, and is incorporated by reference in its entirety for all purposes.

The natural language interface 208 allows the user to formulate a query in a natural language form, rather than in conventional search terms. The natural language interface 208 provides the user with a "user friendly" interface.

Also, the natural language interface 208 can process a query even if there is not an exact match between the user formulated search words and the content in the database. Thus, even if the user does not use the "right" word in the query, the natural language interface 208 may still be able to assist the system 200 to find a relevant answer. Referring back to an earlier example, if the user types "Vehicle Dealer in Chicago", the natural language interface, will be able to process the query. This is due to the fact that the natural language interface 208 understands that "vehicle" is a synonym for "car."

As described in detail in the concurrently filed and commonly assigned application titled, "Natural Language Interface for Searching Database", U.S. application Ser. No. 09/327,605, which is incorporated herein by reference in its entirety for all purposes, the system generates synonyms of the query. Consider, for example, that a user submits a search request: My dog is sick. The system extracts the words dog and sick in order to construct search words "dog sick." The system then creates one or more alternate search words using synonyms. Each synonym is assigned a coefficient based on the closeness of its meaning to the original word. The original word is assigned a coefficient 1.0. This process is shown below in Table I.

TABLE I

| Word | Synonym | Coefficient |
| --- | --- | --- |
| Dog | Canine | 0.9 |
| Dog | Animal | 0.7 |
| Sick | Ill | 0.8 |
| Sick | Hospital | 0.7 |
| Sick | doctor or veterinarian | 0.6 |

The synonyms and various combinations thereof are used to form alternate search words. The alternate search words are listed in an order based on their combined total weights. Thus, an order of alternate words based on synonymous approximations of "Dog Sick" can be "Canine Ill" with a combined total weight of 0.8 (0.9+0.8=1.7), "Animal Ill" with a combined total weight of (0.7+0.8=1.5), and "Animal Hospital" with a combined total weight of (0.7+0.7=1.4). A search word may also be formed by a single word such as Dog (1.0), Canine (0.9) or Ill (0.8), etc.

Furthermore, the system constructs additional search words by a method known as phonetic approximation. The system selects words that are phonetically similar or bear a close resemblance to the original words "Dog" and "Sick." The system assigns a coefficient to each phonetically similar word based on its similarity with the original word, and uses the phonetically similar words and combinations thereof to form additional search words.

Furthermore, the natural language interface 208 is capable of processing misspelled queries or queries having syntax errors. Thus a user who made a spelling or a syntax error in the query may still be able to conduct a transaction. As described in more detail in the concurrently filed and commonly assigned application titled, "Natural Language Interface for Searching Database", U.S. application Ser. No. 09/327,605, which is incorporated herein by reference in its entirety for all purposes, the system registers each user automatically as the user accesses the system. The system creates a preference file as the user is registered. The preference file may be implemented in the system server or the client server. The preference file stores information about to the user, including, but not limited to, information about the user's own natural language vocabulary, writing style, common spelling errors, use of synonyms, etc. The preference file is updated as new information is automatically learned from the user.

Moreover, the natural language interface 208 provides user specific or personalized answers. For example, if a butcher, a stockbroker, and a boxer each include the word "pound" in a query, they may not be referring to the same object. Since the word "pound" may have different meaning depending on the context, most systems will not be able to correctly process the query for all three users. In contrast, the natural language interface 208 will be able to assist each of the different users by considering the different contexts.

These features allow the natural language interface 208 to enhance e-commerce. Furthermore, these features allow the natural language interface 208 to enlarge and retain the service provider's customer base.

Figure 3:
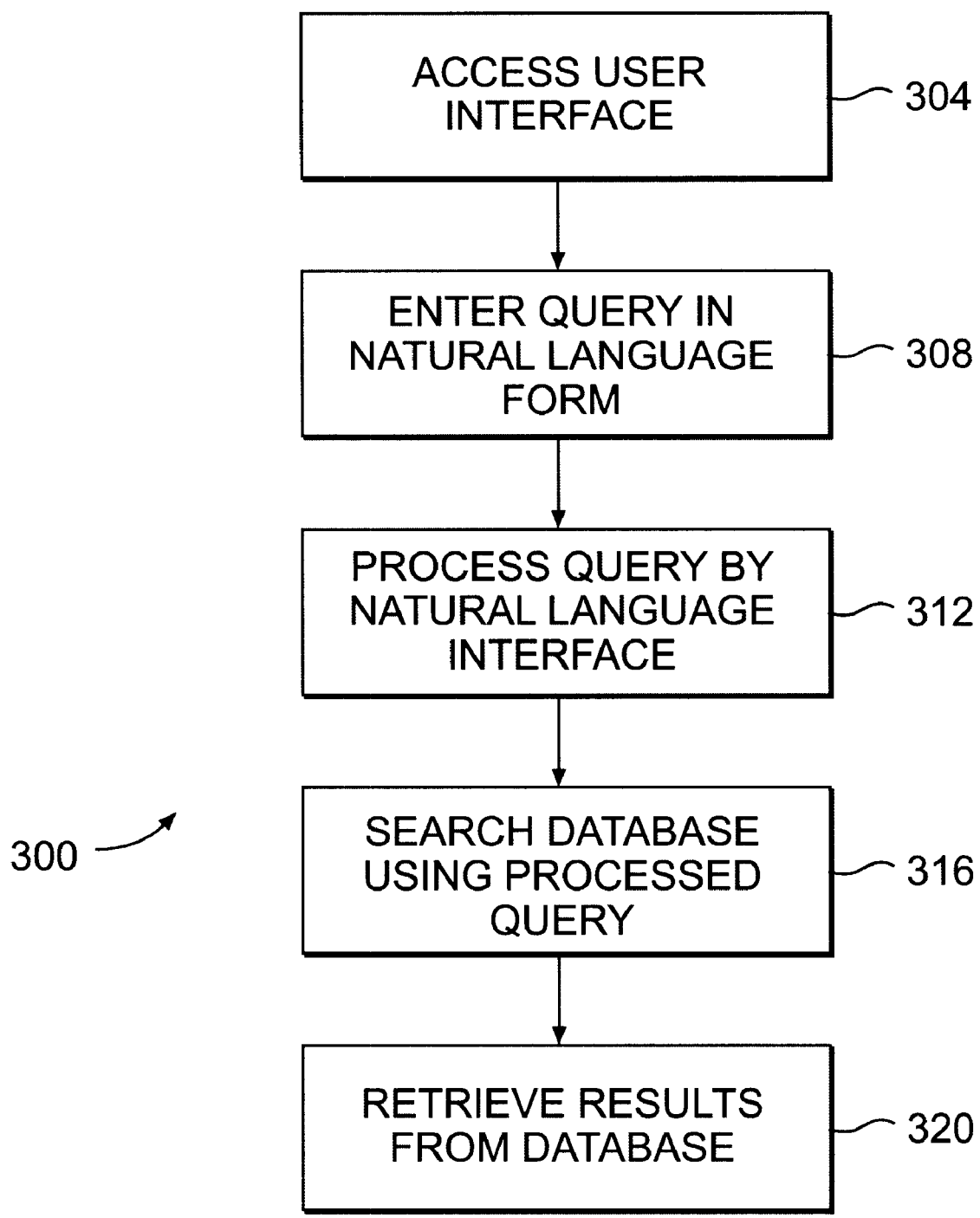
FIG. 3 is a flow diagram illustrating various steps involved in an e-commerce transaction using the system of FIG. 2.

FIG. 3 is a flow diagram 300 of steps involved in an e-commerce transaction using the system 200. In a step 304, the user accesses the user interface 204 provided by the service provider 212. In a step 308, the user enters a query using the natural language interface 208. The natural language interface 208 allows the user to formulate the query in a natural language form. In a step 312, the natural language interface 208 processes the query. In a step 316, the database 216 is searched using the processed query. In a step 320, the service provider 212 retrieves results from the database and provides the results to the user.

What is claimed is:

1. A method for enhancing e-commerce using a natural language interface, comprising the steps of:

accessing a user interface provided by a service provider;

entering a query using a natural language interface, the query being formed in a natural language form;

processing the query by the natural language interface;

searching a database using the processed query;

retrieving results from the database;

providing the results to the user;

creating a preference file for the user;

storing information about the user in the preference file, the information including information relating to the user's identification and information regarding the user's own vocabulary, use of synonyms, common spelling errors, and unique writing style; and retrieving stored information from the preference file to analyze the query.

2. The method as recited in claim 1, further comprising the steps of:

generating synonyms of the query by the natural language interface; and searching the database using the synonyms.

3. The method as recited in claim 1, further comprising the steps of:

generating phonetic approximations of the query by the natural language interface; and searching the database using the phonetic approximations.

4. The method as recited in claim 1, further comprising the steps of:

extracting essential words from the query and ignoring non-essential words from the query in order to generate a most restrictive query; and generating additional queries from the essential words using synonyms, phonetically similar words, and spelling corrections.

5. The method as recited in claim 1, further comprising the steps of:

searching the database using the most restrictive query; and searching the database using the additional queries in a predetermined order.

6. The method as recited in claim 1, further comprising the step of formatting the results from the database into a preselected format.

7. A system for enhancing e-commerce on the Internet, the system allowing a user to purchase goods and services, the user being linked to the system via the Internet, comprising:

a user interface for receiving a query in a natural language form;

a natural language interface coupled to the user interface for processing the query; a service provider coupled to the user interface for receiving the processed query;

one or more databases coupled to the user interface for storing information; and one or more preference files for storing information about the user, including personal information related to the user, and information regarding the user's own vocabulary, use of synonyms, common spelling errors, and unique writing style, wherein the stored information is retrieved from the preference file to analyze the query, wherein the system searches the databases using the processed query and provides the results to the user through the user interface.

8. The system as recited in claim 7, wherein the user interface is a web page via which the user can access the system to conduct e-commerce.

9. The system as recited in claim 7, further comprising:

means for generating synonyms of the query by the natural language interface; and means for searching the database using the synonyms.

10. The system as recited in claim 7, further comprising:

means for generating phonetic approximations of the query by the natural language interface; and means for searching the database using the phonetic approximations.

11. The system as recited in claim 7, further comprising:

means for extracting essential words from the query and ignoring non-essential words from the query in order to generate a most restrictive query; and means for generating additional queries from the essential words using synonyms, phonetically similar words, and spelling corrections.

12. A method for enhancing e-commerce using a natural language interface, comprising the steps of:

accessing a user interface provided by a service provider;

entering a query using a natural language interface, the query being formed in a natural language form;

processing the query by the natural language interface;

searching a database using the processed query;

retrieving results from the database;

providing the results to the user;

creating a preference file for the user;

storing information about the user in the preference file, the information including information relating to the user's identification and information regarding the user's own vocabulary, use of synonyms, common spelling errors, and unique writing style;

retrieving stored information from the preference file to analyze the query;

generating synonyms of the query by the natural language interface;

searching the database using the synonyms;

assigning a coefficient to each of the synonyms based on closeness of meaning to associated words in the query, wherein each original word in the query has the highest coefficient with respect to each of the synonyms associated with each original word; and prioritizing the synonyms.

13. A system for enhancing e-commerce on the Internet, the system allowing a user to purchase goods and services, the user being linked to the system via the Internet, comprising:

a user interface for receiving a query in a natural language form;

a natural language interface coupled to the user interface for processing the query; a service provider coupled to the user interface for receiving the processed query;

one or more databases coupled to the user interface for storing information;

one or more preference files for storing information about the user, including personal information related to the user, and information regarding the user's own vocabulary, use of synonyms, common spelling errors, and unique writing style, wherein the stored information is retrieved from the preference file to analyze the query;

means for generating synonyms of the query by the natural language interface;

means for searching the database using the synonyms;

means for assigning a coefficient to each of the synonyms based on closeness of meaning to associated words in the query, wherein each original word in the query has the highest coefficient with respect to each of the synonyms associated with each original word; and means for prioritizing the synonyms, wherein the system searches the databases using the processed query and provides the results to the user through the user interface.

* * * * *